United States Patent [19]
Albertson et al.

[11] Patent Number: 5,577,389
[45] Date of Patent: Nov. 26, 1996

[54] RUPTURE DISK FRAGMENT COLLECTION TRAP FOR REFRIGERATION SYSTEMS

[76] Inventors: Luther D. Albertson, 3935 Carver St., New Albany, Ind. 47150; Walter R. Key, 6362 Minlo Dr., Indianapolis, Ind. 46227; Mark B. Key, 526A Paradise Way, West, Greenwood, Ind. 46143

[21] Appl. No.: 288,814

[22] Filed: Aug. 11, 1994

[51] Int. Cl.⁶ .............................. F16K 17/14; F25B 43/04
[52] U.S. Cl. .................. 62/115; 62/475; 137/71
[58] Field of Search ................. 137/71, 68.19; 220/89.2; 62/132, 498, 475, 115

[56] References Cited

U.S. PATENT DOCUMENTS

| | | | |
|---|---|---|---|
| 3,155,271 | 11/1964 | Summers et al. | 137/71 X |
| 3,960,206 | 6/1976 | Baxter et al. | 165/61 |
| 4,819,683 | 4/1989 | Buffham et al. | 137/71 |
| 5,153,396 | 10/1992 | Cummings | 200/83 Q |
| 5,187,953 | 2/1993 | Mount | 62/195 |
| 5,259,204 | 11/1993 | McKeown | 62/174 |

*Primary Examiner*—William E. Wayner
*Attorney, Agent, or Firm*—Woodard, Emhardt, Naughton Moriarty & McNett

[57] ABSTRACT

The present invention relates to a rupture disk fragment collection trap for minimizing the loss of refrigerant from a mechanical refrigeration system. A mechanical refrigeration system generally includes a storage vessel for the storage of a refrigerant, which to comply with applicable safety codes requires a pressure relief unit for venting an over-pressurized storage vessel. The pressure relief unit includes a fragmentary carbon rupture disk that provides a mechanical seal to contain the refrigerant, prevent the infiltration of contaminants into the refrigeration system, and rupture to relieve the over-pressurized state of the storage vessel. A mechanical re-seating type pressure relief valve is positioned downstream from the carbon rupture disk to control the flow of refrigerant into the atmosphere. The valve and the rupture disk are connected in fluid communication by a sealed passageway containing a rupture disk fragment collection trap. The trap prevents fragments in the passageway following rupture disk breakage from interfering with the operation of the pressure relief valve. After the pressure in the passageway has dropped below a predetermined value the pressure relief valve closes to prevent any further escape of refrigerant into the atmosphere.

21 Claims, 5 Drawing Sheets

RUPTURE DISK FRAGMENT COLLECTION TRAP FOR REFRIGERATION SYSTEMS

BACKGROUND OF THE INVENTION

The present invention relates generally to the field of pressure relief units for mechanical refrigeration systems, and more particularly in the preferred embodiment to low pressure centrifugal chiller vessels that are protected from over-pressurization by a fragmentary rupture disk.

A low pressure centrifugal chiller vessel is generally utilized in commercial and industrial refrigeration systems, such as for providing air conditioning in hotels, cooling fluid for a manufacturing process, and commercial food refrigeration systems. A low pressure centrifugal chiller vessel generally operates under a vacuum of about sixteen inches of mercury, and should not operate at a pressure exceeding fifteen pounds per square inch above atmospheric pressure. Inherent to commercial and industrial refrigeration systems is an expectation that there will be a minimal amount of down time. Typically, these refrigeration systems are operated until a system breakdown occurs. At that time repair service is initiated to put the system back into operation. The down time that results from this kind of reactive maintenance program is, at best, an inconvenience for the system user. It often can have very costly consequences, such as food spoilage in commercial food refrigeration systems.

A mechanical refrigeration system including a low pressure centrifugal chiller vessel generally utilizes a chlorinated fluorocarbon (CFC) refrigerant. CFC refrigerants, many of which are sold by Dupont under the well known tradename FREON, have various boiling points, depending on the particular type of CFC refrigerant. Some typical types of CFC refrigerants are, for example R-11, R-113, and R-123. Freon and its related family of compounds are well known and widely used as heat transfer media in mechanical refrigeration systems.

Refrigeration systems generally include the pressurized storage of a vaporized refrigerant. To comply with applicable safety codes these systems have a pressure relief system for venting an over-pressurized storage vessel. For many years, it was the practice in the industry to design the pressure relief system to vent the CFC refrigerant from the over-pressurized storage vessel directly into the atmosphere. Recently, however, because of concerns for the environment and possible destruction of the ozone layer above the earth, it has become desirable, and in many cases mandated by law to minimize the release of CFC refrigerants into the atmosphere.

Environmental concerns, though significant, are not the only factor in favor of preventing the release of CFC refrigerant into the atmosphere. In recent years the cost of CFC refrigerants has escalated drastically, having increased over ten fold for some refrigerants in the past few years, while the available supply of CFC refrigerants is dwindling. For these reasons it is desirable to insure that no significant amount of CFC refrigerant is vented into the atmosphere through the pressure relief system.

In the design of mechanical refrigeration systems it has become an industry practice to provide a mechanical re-seating type relief valve. This valve is in series with and down stream from a fragmentary carbon rupture disk. The fragmentary carbon rupture disk is calibrated to burst into pieces at a predetermined maximum pressure. At any pressure up to the maximum pressure the carbon rupture disk provides an excellent positive seal to prevent the venting of CFC refrigerant into the atmosphere, and the infiltration of any contaminants into the refrigeration system. A combination of the fragmentary carbon rupture disk and the mechanical re-seating relief type valve, provides the positive seal characteristics of the carbon rupture disk and the re-seating capability of the mechanical relief valve.

A common limitation of refrigeration systems, having a mechanical re-seating relief valve downstream from a fragmentary carbon rupture disk is that the fragments from the burst carbon rupture disk often lodge in the seat of the relief valve. Naturally any debris or fragments of significant size that lodge in the seat will interfere with the re-seating of the mechanical relief valve after the refrigerant pressure has dropped below a predetermined threshold. Absent the positive seal provided by the mechanical re-seating relief valve, the CFC refrigerant is vented into the atmosphere.

Many designers of refrigeration systems have attempted to overcome this common limitation by utilizing a non-fragmentary metal rupture disk in place of the fragmentary carbon disk. The use of the non-fragmentary metal rupture disk has been shown to eliminate fragments from the burst rupture disk interfering with the re-seating of the mechanical relief valve. However, the metal rupture disk leaves unsolved a litany of other problems and creates a particularly undesirable consequence of its own. One problem the metal rupture disk leaves unsolved pertains to the interference with the re-seating of the mechanical relief valve by other contaminates occurring in the refrigeration system.

A consequence of retrofitting an existing carbon-disk refrigeration system with a non-fragmentary metal rupture disk is that the refrigeration system and the associated chiller vessel must be evacuated. In order to perform this task it is necessary to shut down the commercial or industrial operation utilizing the cooling capacity from the refrigeration system to capture the charge of the CFC refrigerant. This charge of CFC refrigerant can be from 200 lbs. to 2,500 lbs., or more. The evacuation of CFC refrigerant from the system is a very time consuming and costly procedure to perform. In addition, many commercial and industrial refrigeration systems are in constant demand and have no scheduled down time, therefore, the shutting down of the system decreases the production time of the associated commercial or industrial operation.

There remains a need for a system for eliminating any debris which could interfere with the re-seating of the mechanical pressure relief valve, and yet does not require the evacuation of the CFC refrigerant prior to installation. The present invention satisfies this need.

SUMMARY OF THE INVENTION

To address the unmet needs of prior mechanical refrigeration systems, the present invention contemplates an apparatus for minimizing the loss of refrigerant from a pressurized vessel. The apparatus comprises a rupture disk; a pressure relief valve; a passageway connected between the rupture disk and the pressure relief valve; and a trap in the passageway for preventing interference with the operation of the pressure relief valve by debris passing through said passageway following rupture of the rupture disk.

One object of the present invention is to provide a rupture disk fragment collection trap for protecting the operation of the mechanical re-seating relief valve from any fragments or debris, which may interfere with the operation of the valve.

Related objects and advantage of the present invention will be apparent from the following description.

DESCRIPTION OF THE PREFERRED EMBODIMENT

Figure 1:
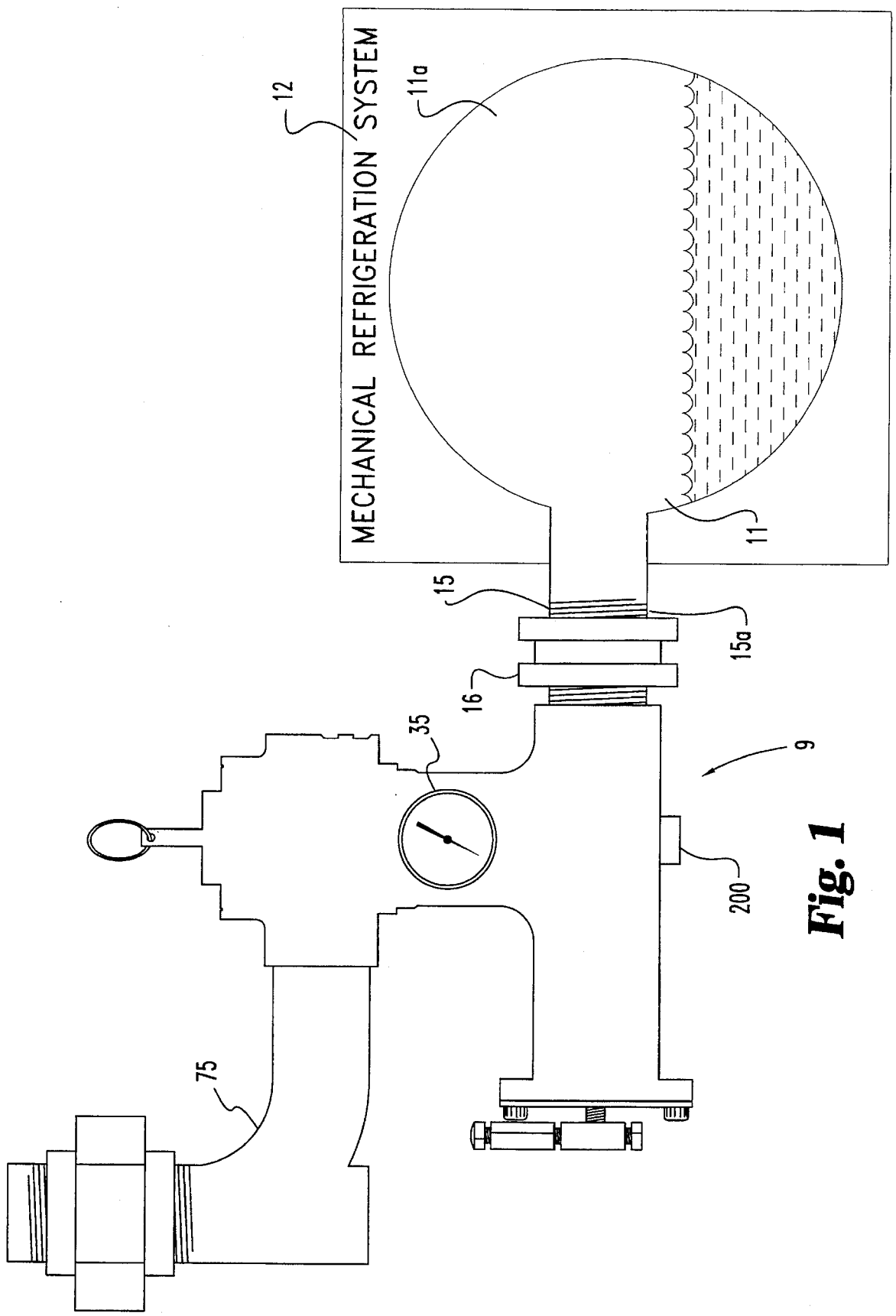
FIG. 1 is an illustrative side elevational view of the mechanical refrigeration pressure relief system with a fragment collection trap according to one embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
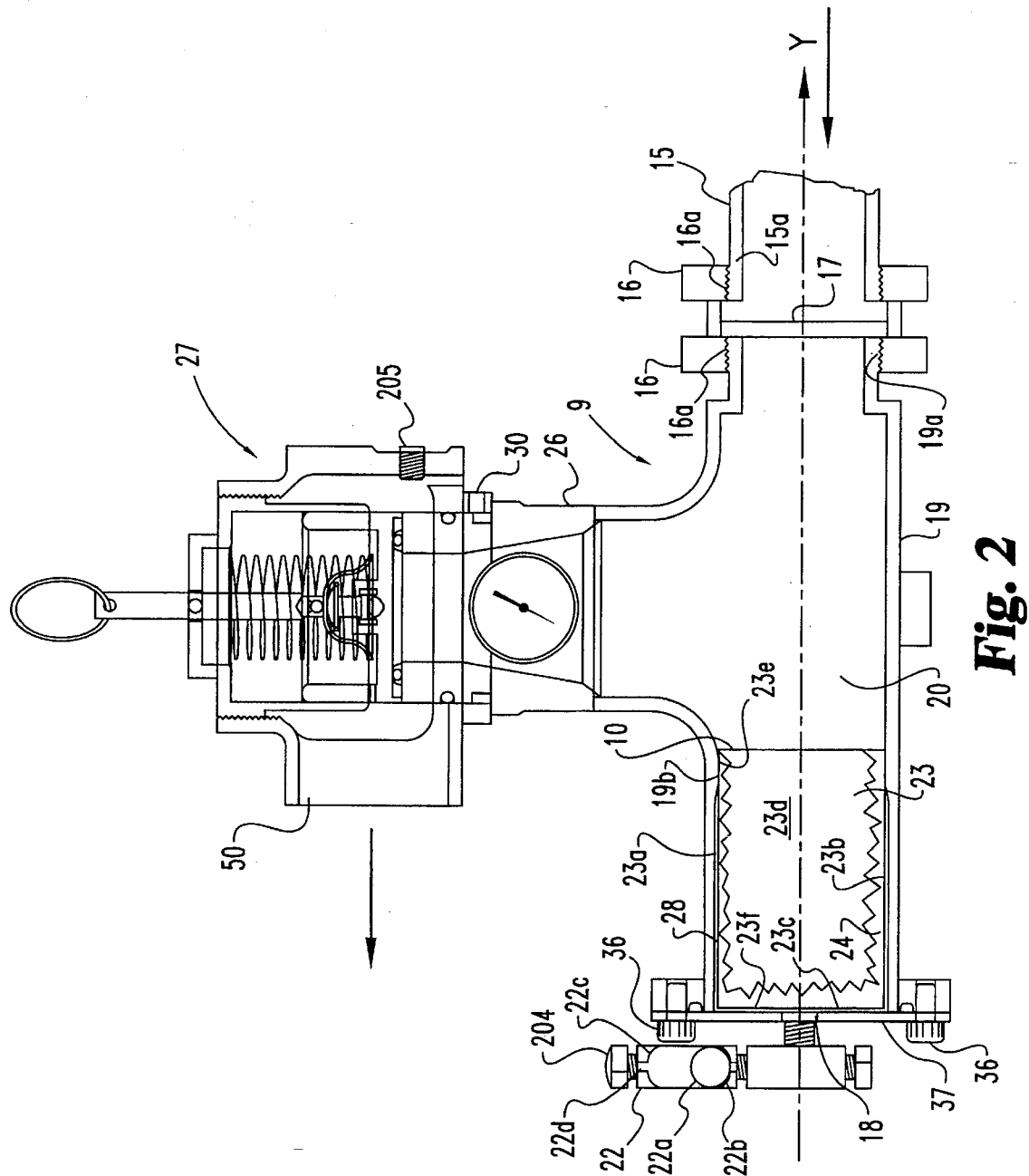
FIG. 2 is an illustrative side elevational view of the FIG. 1, mechanical refrigeration pressure relief system with a fragment collection trap.
Figure 3:
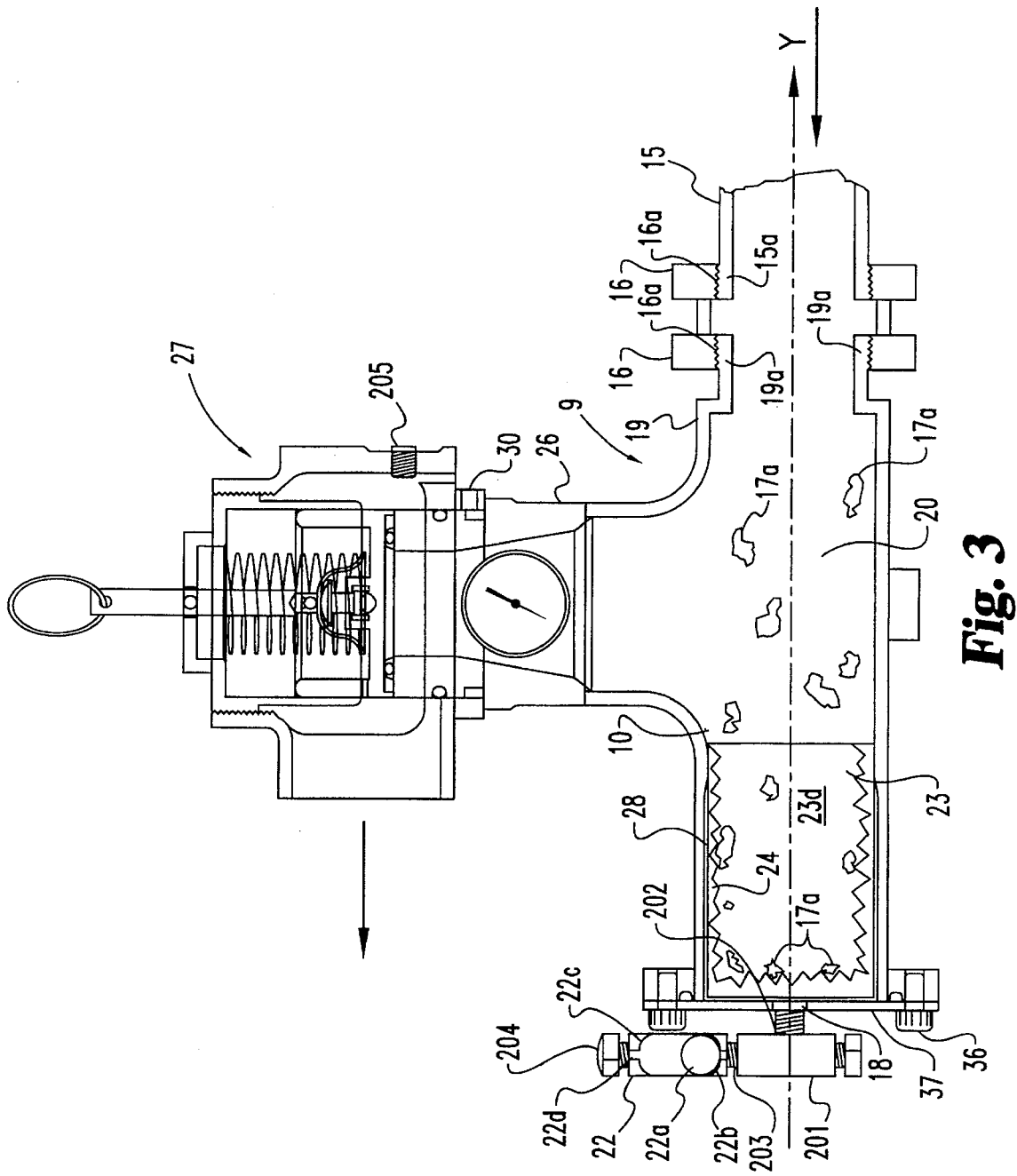
FIG. 3 is an illustrative side elevational view of the FIG. 1, mechanical refrigeration pressure relief system with a fragment collection trap, after the rupture disk has burst.

With reference to FIGS. 1–3, there is illustrated a mechanical refrigeration pressure relief system 9 having a rupture disk fragment collection trap 10 therein. The pressure relief system 9 is connected to a low pressure chiller vessel 11, which forms a part of a mechanical refrigeration system 12. Chiller vessel 11 is designed and manufactured to contain liquid CFC refrigerant, and vaporized CFC refrigerant. The following United States Patents which relate generally to refrigeration systems are herein incorporated by reference; U.S. Pat. Nos. 5,241,837, 4,267,705, 3,276,216, and 3,131,548.

In the previously incorporated U.S. patents the components of a typical refrigeration system are illustrated, into which can be incorporated the pressure relief system 9 with fragment collection trap 10. It should be noted that mechanical refrigeration systems are generally well known to a person skilled in the art. A low pressure centrifugal chiller vessel 11 is designed and constructed to operate normally under a vacuum of sixteen inches of mercury, and the pressure in the vessel should not exceed 15 pounds per square inch above atmospheric pressure. The interior volume 11a of the chiller vessel 11 being subject to a vacuum creates the potential, if a leak develops in a seal, for the infiltration of contaminates, such as air and moisture into the vessel 11. Infiltration of contaminants into the refrigeration system 12 generally causes an increase in condensing pressure and compressor power requirement, while effectively reducing the chillers efficiency and cooling capacity.

The pressure relief system 9 is connected to the chiller vessel 11 through a conduit 15. In the preferred embodiment the conduit 15 is fabricated from a corrosion resisting stainless steel pipe. Alternate materials are contemplated which also preclude the formation of corrosion and scale, such as nickel or chromium plated pipes. The conduit 15 is substantially cylindrical, and has an externally threaded end 15a. Further, the conduit 15 must be structurally strong to support the aggregate weight of the pressure relief system that is cantilever mounted thereto. An integral support mounting coupling 200 is formed on the pressure relief system 9 for providing a connection point for an external support (not illustrated). In the preferred embodiment the pressure relief system 9 is mounted in a horizontal orientation.

In the preferred embodiment an intermediary coupling member 16 having an internally threaded surface 16a is utilized to connect conduit 15 with the pressure relief system 9. The internally threaded surface 16a corresponds to the external threads formed on conduit 15a. Coupling member 16 supports a fragmentary carbon rupture disk 17 that extends across the conduit 15 for blocking the flow of refrigerant into the pressure relief system 9. Pressure relief system 9 and conduit 15 are designed and constructed to be in a sealed fluid communication with the chiller vessel 11 when the carbon rupture disk 17 burst.

Fragmentary carbon rupture disks 17 are well known in the industry for providing a fluid tight seal, and for protecting against over-pressurization of a chiller vessel 11. The sizing of the fragmentary carbon rupture disk 17 is determined based on a plurality of parameters, which include: the maximum operating pressure of the chiller vessel 11; the volumetric flow rate required for relieving the over-pressurized state of chiller vessel 11; the diameter of the passageway; and the material properties of the disk. In the preferred embodiment the carbon rupture disk is two inches in diameter and has a material thickness of forty thousandths (0.040) of an inch in order to meet the physical requirements of the system. In one alternate form of the present invention a carbon rupture disk of three inches in diameter with a material thickness of forty thousandths (0.040) of an inch is utilized. It is further understood that carbon rupture disks having other diameters and thicknesses are contemplated. The carbon rupture disk of the preferred embodiment is designed to burst at a pressure of 15 pounds per square inch above atmospheric pressure to allow the chiller vessel 11 to vent.

With reference to FIG. 3, there is illustrated the pressure relief system 9 in which a sudden pressure surge in the chiller vessel 11 caused the fragmentary carbon disk 17 to rupture into fragments 17a, thereby allowing the CFC refrigerant to escape into the passageway of pressure relief system 9. The pressure in the chiller vessel 11 decreases dramatically as a portion of the CFC refrigerant escapes into the pressure relief system 9 and ultimately a portion of the refrigerant is vented into the atmosphere. A gauge 35 is connected to the pressure relief system 9 for indicating the refrigerant pressure within pressure relief system 9. The gauge 35 is for alerting an attendant that the pressure relief system 9 has had an increase in pressure, thereby indicating that the rupture disk 17 burst.

In the preferred embodiment, a double check pressure equalizing valve 22 is incorporated into the pressure relief system 9 for venting refrigerant into the atmosphere from small leaks in the fragmentary carbon rupture disk 17. The double check valve 22 is designed for preventing the accumulation of refrigerant from a small leak in the pressure relief system 9. The double check valve 22 is designed and constructed to vent the refrigerant into the atmosphere, after a predetermined pressure has developed within the pressure relief system 9 thereby displacing a seating ball 22a from a ball seat 22b. An aperture 18 is formed in a housing 19 for connecting the internal volume 20 of housing 19 with the double check valve 22. An elbow 201 having an externally threaded fastener 202 is received within the internally threaded aperture 18, and an externally threaded pipe 203 connects the elbow with the double check valve 22. In an alternative embodiment an outlet 204 of the double check pressure equalizing valve 22 is connected to an opening 205 in the valve 27. This arrangement prevents the seapage of CFC Refrigerant into the equipment room.

In the preferred embodiment the housing 19 is fabricated from a corrosion resisting stainless steel pipe or tube. Alternate materials are contemplated which precludes the formation of corrosion and scale, such as nickel or chromium plated pipes. The housing 19 is substantially cylindrical, and has an externally threaded end 19a. Externally threaded end 19a engages with the internally threaded surface 16a of coupling member 16 to connect the pressure relief system 9 through conduit 15 to chiller vessel 11. A plurality of threaded fasteners 36 hold a removable end plate 37 in contact with housing 19. Removable end plate 37 provides access to the internal volume 20 of housing 19 for inspecting, positioning, installing, and removing container 23.

In the event of over-pressurization of the chiller vessel 11, the fragmentary carbon rupture disk 17 will burst, thereby allowing a flow of refrigerant into the housing 19. Upon carbon rupture disk 17 bursting the pressure in housing 19 is elevated to a sufficient level to drive the seating ball 22a of check vale 22 into a sealing arrangement with an upper seat 22c, thereby closing aperture 22d. With aperture 22d sealed by seating ball 22a the refrigerant is unable to escape into the atmosphere, through check valve 22 and is now contained within pressure relief assembly 9.

The trap 10 comprises a generally cylindrical container 23, disposed within the interior volume 20 of housing 19 adjacent removeable end plate 37. The cylindrical container 23 has an external cylindrical surface 23a that contacts a corresponding internal cylindrical surface 19b of housing 19. A portion of the cylindrical container 23 is spaced apart a radial distance 28 from the internal cylindrical surface 19b to allow for the relaxation of assembly tolerances, provide for the ease of installation of the container within the housing 19, and to allow pressurized refrigerant to flow around the container to the double check valve 22. Container 23 has a cylindrical wall member 23b and a base wall member 23c that define an interior volume 23d. The cylindrical wall member 23b and base wall member 23c have corresponding interior surfaces 23e and 23f that are coated with a layer of tack compound 24 of approximately ⅛" in thickness.

The tack compound 24 generally is a non-rigid sticky substance having suitable holding capacity to retain the fragments 17a, from a burst carbon rupture disk 17, that flow into the trap 10. In the preferred embodiment the tack compound 24 defines a very high viscosity grease, however, it is understood that there are other materials having suitable characteristics to retain the fragments 17a within the interior volume 23d of the trap 10. Further, the trap 10 captures other contaminants being transported by the escaping refrigerant into the interior volume 23d of the trap 10.

In the preferred embodiment the housing 19 is fabricated from stainless steel pipe, having a two inch diameter and a ⅛ inch wall thickness, welded together to form the required geometric shape. In one alternate form of the present invention a three (3) inch carbon rupture disk is utilized and placed within a system having a four inch diameter housing that is fabricated from a stainless steel pipe. An alternate embodiment contemplates casting the housing 19 as a single piece.

A flange 26 is disposed transverse to a central axis Y of housing 19 for attaching a mechanical re-seating type of valve 27 to the housing. The flange 26 functions to support the re-seating valve 27 on housing 19, and to connect the re-seating valve 27 in fluid communication with the chiller vessel 11. In the preferred embodiment the flange 26 is fabricated from a corrosion resisting stainless steel pipe or tube. As previously discussed the flange could alternately be integrally cast with housing 19. Alternate materials are contemplated which also preclude the formation of corrosion and scale such as nickel or chromium plated pipes. A plurality of externally threaded fasteners 30 are utilized to fasten the re-seating valve to flange 26.

In the preferred embodiment the re-seating valve 27 is referred to as a spring actuated nozzle type pop-off relief valve. Model #337 that is available from Kunkle Valve Company, Ft. Wayne, Id. is one example of this type of valve; this valve reseals within 3 pounds of the set pressure for the valve (15 pounds per square inch). Other types of re-seating pressure relief valves that provide a positive re-seating capacity are also contemplated.

With reference to FIG. 3, an example is provided illustrating how fragment collection trap 10 prevents fragments 17a from the burst carbon rupture disk 17 from interfering with the resealing of pressure relief valve 27. Upon over-pressurization of chiller vessel 11, the force produced therein by the pressurized refrigerant is sufficient to rupture the fragmentary carbon rupture disk 17. The discharge of the pressurized refrigerant into the housing 19 has sufficient force to carry the fragments 17a past the flange 26 and into the container 23 that is disposed adjacent the end plate 37. The momentum of fragments 17a carry them into the internal volume 23d of the cylindrical container 23, where they engage the tack compound 24. With the fragment collection trap 10 having contained the fragments 17a, the mechanical valve 27 is able to re-seat when the pressure drops below a predetermined threshold.

Figure 4:
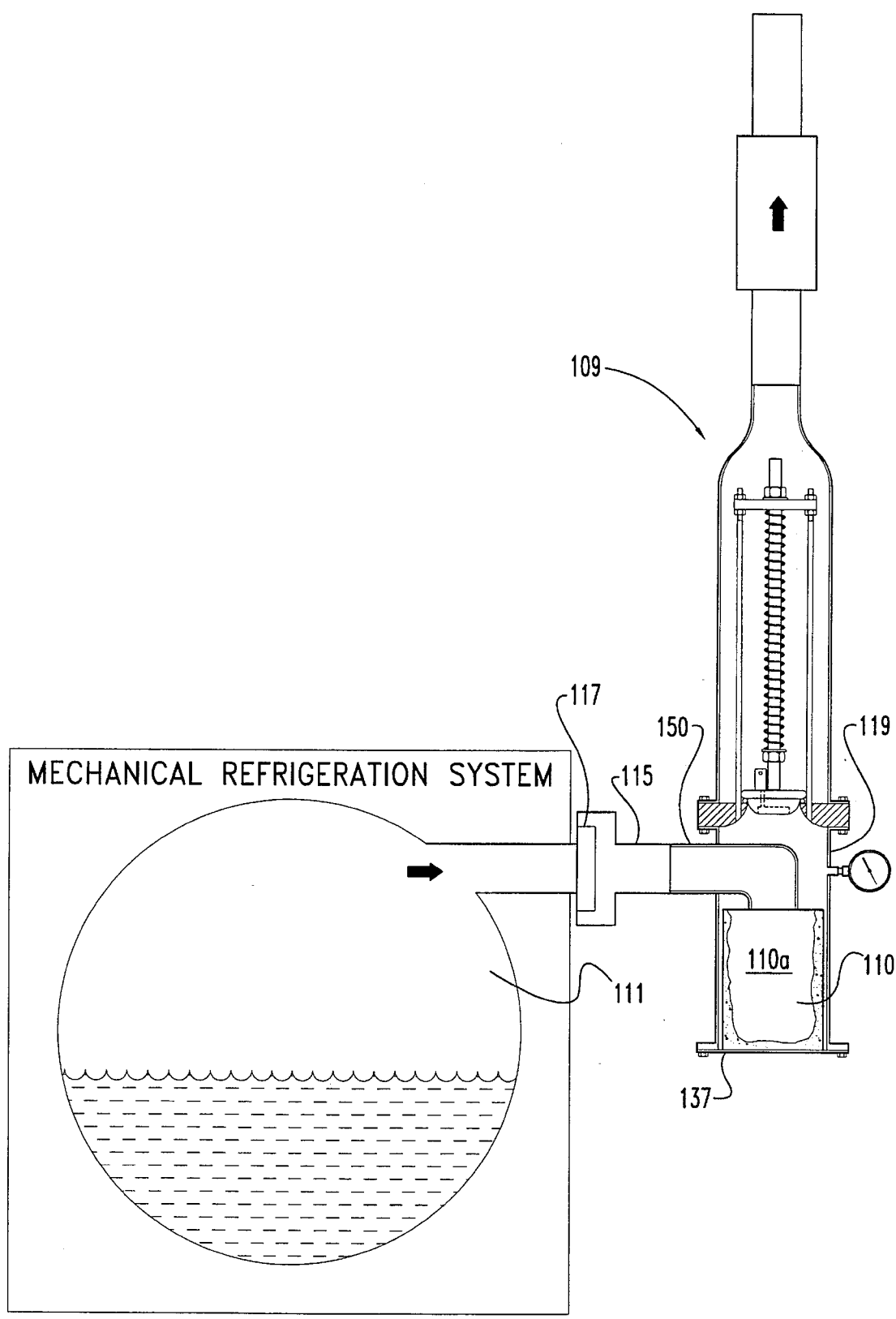
FIG. 4 is an illustrative side elevational view of the mechanical refrigeration pressure relief system with a fragment collection trap according to another embodiment of the present invention.
Figure 5:
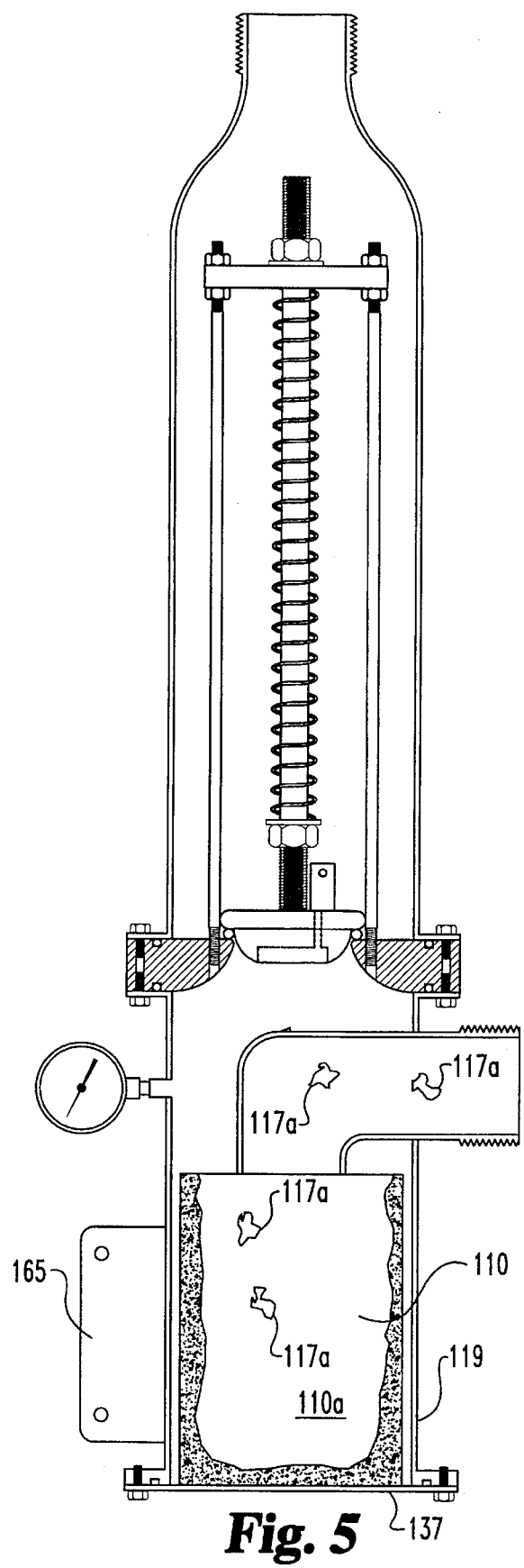
FIG. 5 is an enlarged illustrative side elevational view of the FIG. 4, mechanical refrigeration pressure relief system with a fragment collection trap having the refrigeration unit removed.

One alternative of the present invention is illustrated in FIGS. 4 and 5, wherein the pressure relief system 109 is oriented transversely to a conduit 115 that connects a chiller vessel 111 with the pressure relief system 109. The general construction and function of the corresponding pressure relief system 109 is virtually the same as the pressure relief system 9 in most respects. An elbow 150 is positioned relative to housing 119 to direct the refrigerant and fragments 117a existing a chiller vessel 111 through a burst carbon rupture disk 117 into trap 110.

In the alternative form of the present invention, trap 110 is disposed adjacent a removable end plate 137 of housing 119. The trap 110 is positioned within the housing 119 for capturing the fragments 117a and any other contaminates that are transported into the interior volume 110a of the trap. Further, a mounting bracket 165 is provided to support the pressure relief system 109 relative to chiller vessel 111.

The following steps highlight a retrofit installation of the pressure relief system 9 into an existing operation. The first step is to determine the mounting arrangement for the pressure relief system 9 in relation to the rupture disk vent pipe 75 and the chiller vessel 11. After ascertaining the desired mounting location, it is necessary to remove a quantity of vent pipe 75 in order to install the pressure relief system 9. Connect the threaded end 19a of housing 19 to the internally threaded surface 16a of coupling member 16. After connecting housing 19 to the chiller vessel 11 insure that the pressure relief system 9 is oriented in a substantially horizontal mode. It is now necessary to connect the vent piping from the atmosphere to the discharge opening 50 of valve 27. Another step involves removing the end plate 37 from housing 19 and sliding the container 23 axially within the housing 19. After positioning the container 23 within housing 19, refasten the end plate 37 with fasteners 36 to housing 19 to obtain a positive seal.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An apparatus for minimizing the loss of refrigerant from a pressurized vessel in a mechanical refrigeration system, comprising:

a rupture disk;

a pressure relief valve;

a passageway connecting between said rupture disk and said pressure relief valve; and a trap not extending substantially into said passageway for preventing interference with the operation of said pressure relief valve by debris passing through said passageway following rupture of said rupture disk.

2. The apparatus of claim 1 wherein said passageway connecting between said rupture disk and said pressure relief valve is sealed when pressurized by rupture of said rupture disk.

3. The apparatus of claim 2 which further includes a check valve, said check valve for selectively venting refrigerant from said passageway.

4. The apparatus of claim 3, wherein said check valve having a check ball, said check ball moveable between a first position and a second position.

5. The apparatus of claim 4, wherein said first position for preventing the accumulation of refrigerant within the passageway before rupture of said rupture disk, and wherein said second position for preventing the flow of refrigerant through said check valve into the atmosphere following rupture of said rupture disk.

6. The apparatus of claim 1 wherein said rupture disk includes a fragmentary carbon member.

7. The apparatus of claim 1 wherein said trap includes a contact surface engageable with the debris, said contact surface being substantially non-rigid.

8. The apparatus of claim 7 wherein said contact surface being at least partially sticky.

9. The apparatus of claim 8 wherein said sticky substance being a high viscosity grease.

10. The apparatus of claim 1 wherein said trap includes a container, said container being disposed within said passageway.

11. The apparatus of claim 10 wherein said container being removable from said passageway.

12. The apparatus of claim 11 wherein said container having an interior contact surface engageable with the debris.

13. The apparatus of claim 12 wherein said contact surface being at least partially sticky.

14. The apparatus of claim 13 wherein said sticky substance being a high viscosity grease.

15. A method for minimizing the loss of refrigerant from a a mechanical refrigeration unit including a fragmentary rupture disk, a pressure relief valve, and a passageway connecting between the disk and valve, the method comprising:

providing a trap having a fragment contact portion which is at least partially sticky;

rupturing the fragmentary rupture disk when the refrigerant pressure exceeds a predetermined pressure;

intercepting the fragments from the fragmentary rupture disk to prevent the fragments from interfering with the operation of the pressure relief valve.

opening the pressure relief valve when the refrigerant pressure in the passageway exceeds the predetermined pressure to vent refrigerant into the atmosphere; and closing the pressure relief valve when the refrigerant pressure in the passageway drops below the predetermined pressure.

16. The method of claim 15, which additionally includes retaining the fragments within a trap.

17. The method of claim 15, which additionally includes opening a check valve to prevent the accumulation of refrigerant within the passageway prior to the rupture disk bursting.

18. The method of claim 17, which additionally includes closing the check valve to prevent the release of refrigerant into the atmosphere after the rupture disk has burst.

19. In combination:

a mechanical refrigeration system including a pressurized vessel;

a pressure relief valve;

a fragmentary carbon rupture disk;

a passageway connecting between said rupture disk and said pressure pressure relief valve; and a trap not extending substantially into said passageway for preventing fragments from said rupture disk from interfering with the operation of said pressure relief valve.

20. An apparatus for minimizing the loss of refrigerant from a pressurized vessel in a mechanical refrigeration system, comprising:

a rupture disk;

a pressure relief valve;

a passageway connecting between said rupture disk and said pressure relief valve; and a trap having a partially sticky contact surface in communication with said passageway for preventing interference with the operation of said pressure relief valve by debris passing through said passageway following rupture of said rupture disk.

21. The apparatus of claim 20, wherein said trap not extending substantially into said passageway.

* * * * *